United States Patent [19]
Mainprize

[11] 3,729,647
[45] Apr. 24, 1973

[54] SPARK IGNITION SYSTEMS

[76] Inventor: David Mainprize, 37 Bearlane Close, near Tamworth, England

[22] Filed: May 10, 1971

[21] Appl. No.: 141,820

[30] Foreign Application Priority Data

May 21, 1970  Great Britain.....................24,601/70

[52] U.S. Cl.....315/209 SC, 123/148 E, 315/209 CD
[51] Int. Cl..........................H05b 37/02, F02p 1/00
[58] Field of Search...................315/209 SC, 209 CD; 123/148 E

[56] References Cited

UNITED STATES PATENTS

| | | | |
|---|---|---|---|
| 3,474,291 | 10/1969 | Kallage | 315/209 SC |
| 3,383,555 | 5/1968 | Minks | 315/209 CD |
| 3,583,378 | 6/1971 | Pattee | 315/209 CD X |
| 3,596,174 | 7/1971 | Hovenga | 315/209 SC X |
| 3,577,971 | 5/1971 | Cavil | 315/209 CD X |

*Primary Examiner*—Alfred L. Brody
*Attorney*—Holman & Stern

[57] ABSTRACT

A spark ignition system for an internal combustion engine has a capacitor which is charged by an alternator through a rectifier. The capacitor is discharged at intervals to produce a spark, and voltage sensitive means is provided for short-circuiting the alternator output when a capacitor is charged to a predetermined level. Preferably the capacitor discharges through a thyristor, and means is provided for ensuring that the thyristor always turns off between cycles.

13 Claims, 4 Drawing Figures

SPARK IGNITION SYSTEMS

This invention relates to spark ignition systems for internal combustion engines.

In one aspect, the invention resides in a spark ignition system for an internal combustion engine comprising in combination a capacitor, an alternator driven by the engine and serving to charge the capacitor through a rectifier, means for discharging the capacitor at intervals to produce a spark, and voltage sensitive means for short-circuiting the alternator output when the capacitor is charged to a predetermined level.

In another aspect, the invention resides in a spark ignition system for an internal combustion engine, comprising in combination a capacitor, an alternator driven by the engine and serving to charge the capacitor through a full wave rectifier, a thyristor which is turned on at intervals to discharge the capacitor and thereby produce a spark, and a Zener diode between the rectifier and capacitor, the Zener diode blocking the circuit from the rectifier to the capacitor for a portion of each cycle of the alternator output so as to facilitate turn-off of the thyristor.

In another aspect, the invention resides in a spark ignition system for an internal combustion engine, comprising in combination a capacitor, an alternator driven by the engine and serving to charge the capacitor through a half wave rectifier, and a thyristor which is turned on at intervals to discharge the capacitor and thereby produce a spark.

In the accompanying drawings.

Figure 1:
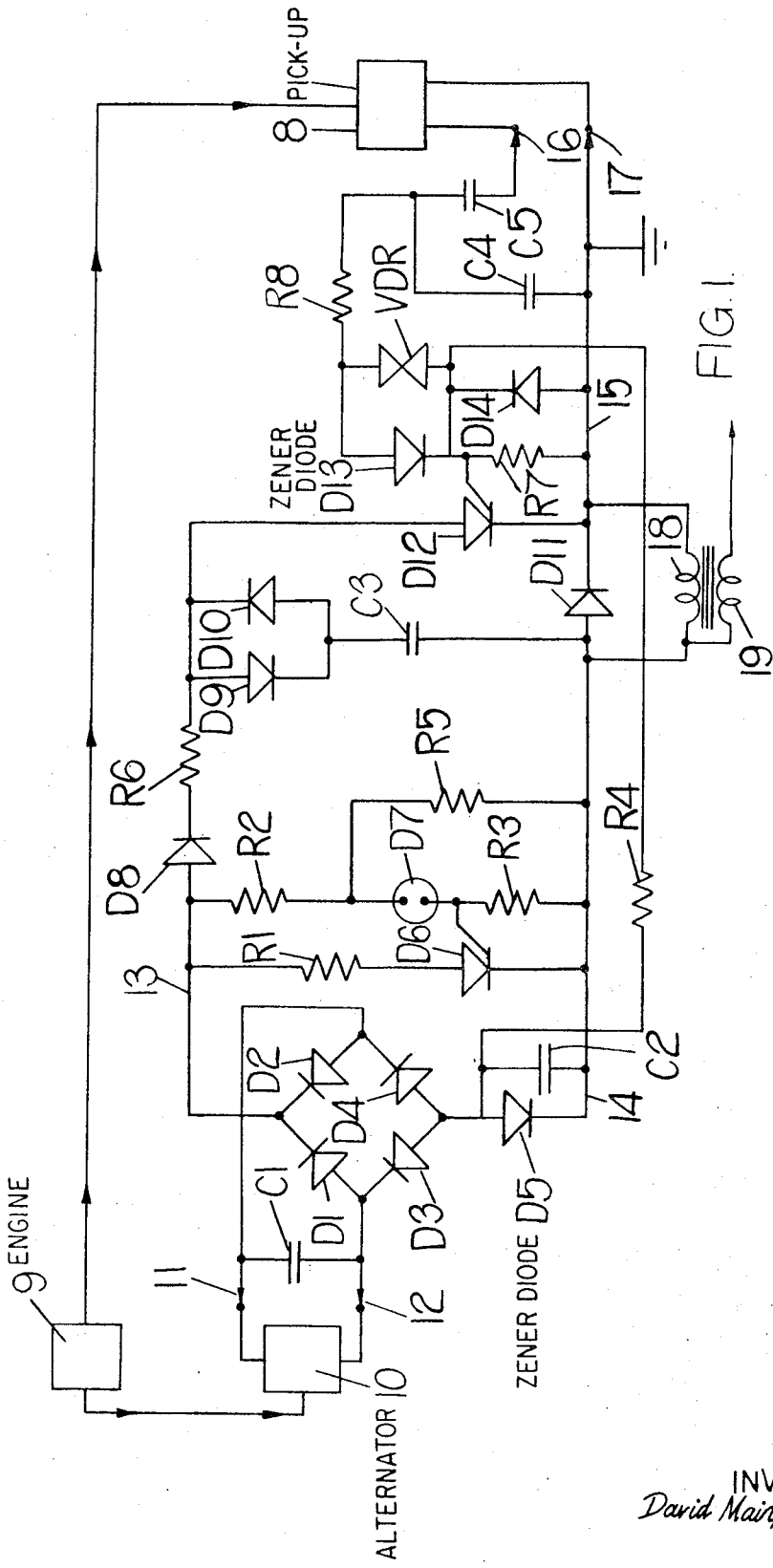
FIG. 1 is a circuit diagram illustrating one example of the invention.

Referring to FIG. 1, an alternator 10 driven by a motor-cycle or other internal combustion engine 9 produces an output at terminals 11, 12 which are bridged by a capacitor C1 and are connected to the input terminals of a full wave rectifier including diodes D1, D2, D3, D4. One of the output terminals of the full wave rectifier is connected to a supply line 13, and the other output terminal of the full wave rectifier is connected through a Zener diode D5 to a supply line 14, the Zener diode D5 being bridged by a capacitor C2. Connected across the lines 13, 14 are two parallel circuits, the first of which includes a resistor R1 and a thyristor D6 in series, and the second of which includes a resistor R2, a neon tube D7 and a resistor R3 in series, the junction of the neon tube D7 and resistor R3 being connected to the gate of the thyristor D6, and the junction of the resistor R2 and neon tube D7 being connected through a resistor R5 to the line 14.

The line 14 is connected through a diode D11 to an earth line 15, and connected between the lines 13, 15 are a diode D8, a resistor R6 and a thyristor D12 in series. The junction of the resistor R6 and thyristor D12 is connected to the anode of the diode D9 and the cathode of a diode D10, the cathode of the diode D9 and the anode of the diode D10 being interconnected and connected to the line 14 through a capacitor C3.

The circuit further includes a pair of terminals 16, 17 connected to a pick-up 8 driven by the engine 9, the terminal 17 being connected to the line 15. The terminal 16 is connected to the line 15 through a pair of capacitors C5, C4 in series, the junction of the capacitors C5, C4 being connected through a resistor R8 to the anode of a Zener diode D13, the cathode of which is connected to the gate of the thyristor D12, to the line 15 through a resistor R7 and a diode D14 in parallel, and to the cathode of the Zener diode D5 through a resistor R4. The anode-cathode path of the diode D13 is bridged by a voltage dependent resistor VDR. Finally, the ignition coil of the engine has a primary winding 18 connected across the diode D11, and a secondary winding 19 for producing the required sparks.

In operation, the alternator 10 provides an output which is fed through the full wave rectifier D1, D2, D3, D4 and charges the capacitor C3. The poles of the alternator are shaped to give a high peak voltage, and in a typical example three full cycles of the alternator output are available between sparks, but the capacitor C3 can be charged to the required voltage in considerably less than this time. Once the desired voltage has been reached across the capacitor C3, the neon tube D7 breaks down, turning on the thyristor D6 which then effectively short-circuits the output from the alternator.

At the instant when a spark is required, the thyristor D12 is turned on in a manner to be described, and the capacitor C3 then discharges through the thyristor D12 and the primary winding 18 to produce the sparks.

The purpose of the resistor R1 is to limit the current flowing from the full wave rectifier through the thyristor D6 and Zener diode D5 when the capacitor C1 is discharged, and a diode D8 is provided to prevent discharge of the capacitor C3 through the thyristor D6. The resistor R6 is necessary because the diode D8 has a finite turn-off time, and could produce spikes which might turn on the thyristor D12 in the absence of the resistor R6. The provision of the Zener diode D5 ensures that there is a point in each cycle of the alternator during which no current is supplied to the lines 13, 14, so that the thyristors D6 and D12 can turn off during this period. The length of the period will be the length of time for which the alternator output is below the breakdown voltage of the Zener diode D5. The capacitor C2 connected across the Zener diode D5 provides a negative signal through the resistor R4 to the gate of the thyristor D12, assisting in turning off the thyristor D12.

The diodes D9 and D10 are provided to assist in the turn-off of the thyristor D6.

Figure 2:
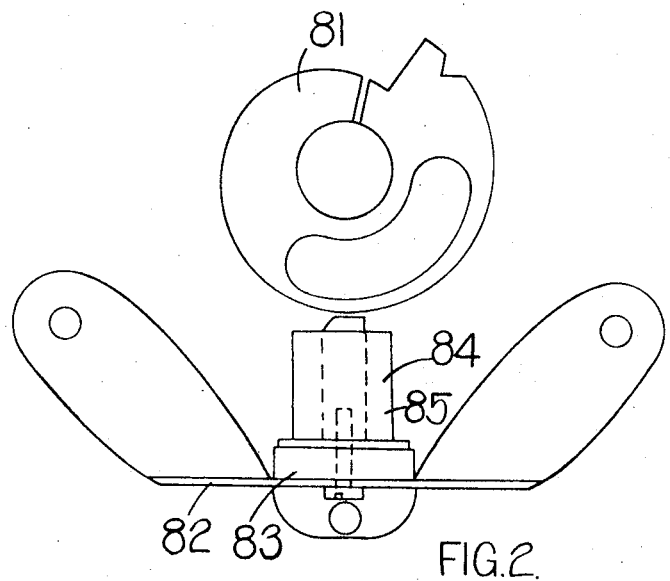
FIG. 2 is a diagrammatic illustration of the pick-up used in FIG. 1.
Figure 3:
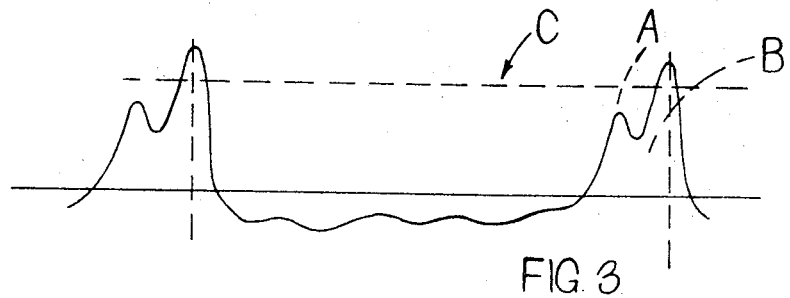
FIG. 3 illustrates the waveform produced by the pick-up shown in FIG. 2.

Referring now to FIG. 2, the pick-up 8 includes a rotor 81 which is driven by the engine shaft, and a mounting bracket 82 carrying a permanent magnet 83 from which extends a magnetic core 84 surrounded by a winding 85. The rotor 81 passes the winding 85, and is shaped to produce a wave-form as shown in FIG. 3. It will be seen that a positive pulse is produced each time a spark is required, the shape of the pulse being predetermined by the rotor 81. The amplitude of the pulse will of course depend upon the speed of the engine, and the drawing shows the arrangement for a given engine speed.

For the particular engine for which the system shown is designed, it is desired to have an advance mechanism which operates in a stepped manner, and for this reason the pick-up is designed to produce two slopes indicated in the drawing by the dotted lines A and B. At low engine speeds, the voltage developed across the terminals 16, 17 is insufficient to cause the Zener diode D13 to conduct in the reverse direction, and moreover the resistor VDR behaves as a high resistance. Positive signals at the terminal 16 are conducted by way of the resistor R8, the Zener diode D13, which of course can conduct in the forward direction, and the gate-cathode path of the thyristor D12, so that the resistance to positive voltages at the terminal 16 is low. The resistance to negative voltages is determined almost entirely by the resistor VDR, since the diode D13 cannot conduct in the reverse direction at this stage. The effect of this is that the capacitor develops a positive voltage which is slightly less than the voltage developed by the pick-up. Assuming the engine is running at a steady speed, the voltage developed by the capacitor is represented in FIG. 3 by the dotted line C. Assuming that this voltage has been developed across the capacitor C5, then when the next positive voltage pulse appears, the voltage at the terminal 16 will rise along the slope A, but will have no effect on the thyristor D12 at this stage because the peak of the slope A is still below the line C. The voltage then falls off between the slope A and the beginning of the slope B, and then rises again until the line C is reached, at which point current flows through the gate and cathode of the thyristor D12 to turn it on and produce a spark as previously described.

This sequence of operations continues as long as the speed is constant, and if the speed rises a wave-form similar to that shown will be obtained but with higher amplitudes on the slopes A and B because of the increased speed. However, because the engine speed is higher, the capacitor C5 will be charged to a higher level and so the line C will also be at a higher position on the wave-form. The effect of this is that the timing is not altered substantially, although the exact point on the slope B at which ignition takes place will vary with speed.

When the pick-up voltage is sufficient to cause the Zener diode D13 to conduct in its reverse direction, that is to say when the engine speed reaches a predetermined value, the resistance to negative voltages is suddenly reduced because the resistor VDR is short-circuited by the Zener diode D13. The result of this is that the capacitor C5 can, during the negative half cycles, discharge more, so that as the engine speed increases from below the predetermined engine speed to above the predetermined engine speed, the peaks of the slopes A and B continue to rise but the line C does not rise in proportion. The effect of this is that above the predetermined speed, the peak of the slope A is above the line C, so that the thyristor D12 is turned on along the slope A, producing a stepped advance in timing. An advance in timing is arranged to compensate for the slight retard in timing produced by the inductance of the pick-up winding as the engine speed increases. It will of course be appreciated that the arrangement as shown is desirable for one particular engine, but a continuously advancing curve could be produced using a similar circuit operating on a single pulse with a shallower slope so that the trigger point travels gradually down the slope to produce a continuous advance.

When the engine speed changes, the circuit takes a finite time to establish a steady voltage on the capacitor C5. During this time the timing of the circuit departs from the steady state condition. At speeds below that at which the Zener diode D13 conducts, the time is determined by the resistance of the resistor VDR and the value of the capacitor C5. In order that the circuit should adjust to engine speeds as quickly as possible, the resistance of the resistor VDR should be fairly low. If a linear resistor were used, the resistor and the compacitor C4 would tend to differentiate the pick-up wave-form at very low speeds and cause unwanted variations in timing, together with a rise in the minimum triggering speed. The use of the voltage dependent resistor VDR overcomes this problem because its effective resistance increases as the engine speed, and hence the pick-up output voltage, decreases.

When the thyristor D12 is turned on, the capacitor C3 discharges to produce the required spark, and the circuit will then ring for one quarter of a cycle, after which the diode D11 prevents the capacitor C3 from being charged in the reverse direction by the ignition coil. Because the pulse applied to the gate of the thyristor D12 is relatively long, the ringing is not sufficient in itself to ensure that the thyristor D12 turns off. The diodes D9 and D10 are included as mentioned earlier to limit charging of the capacitor C3 sufficiently to ensure that the thyristor D12 turns off between the half cycles of current supplied to the capacitor C3 from the alternator.

Figure 4:
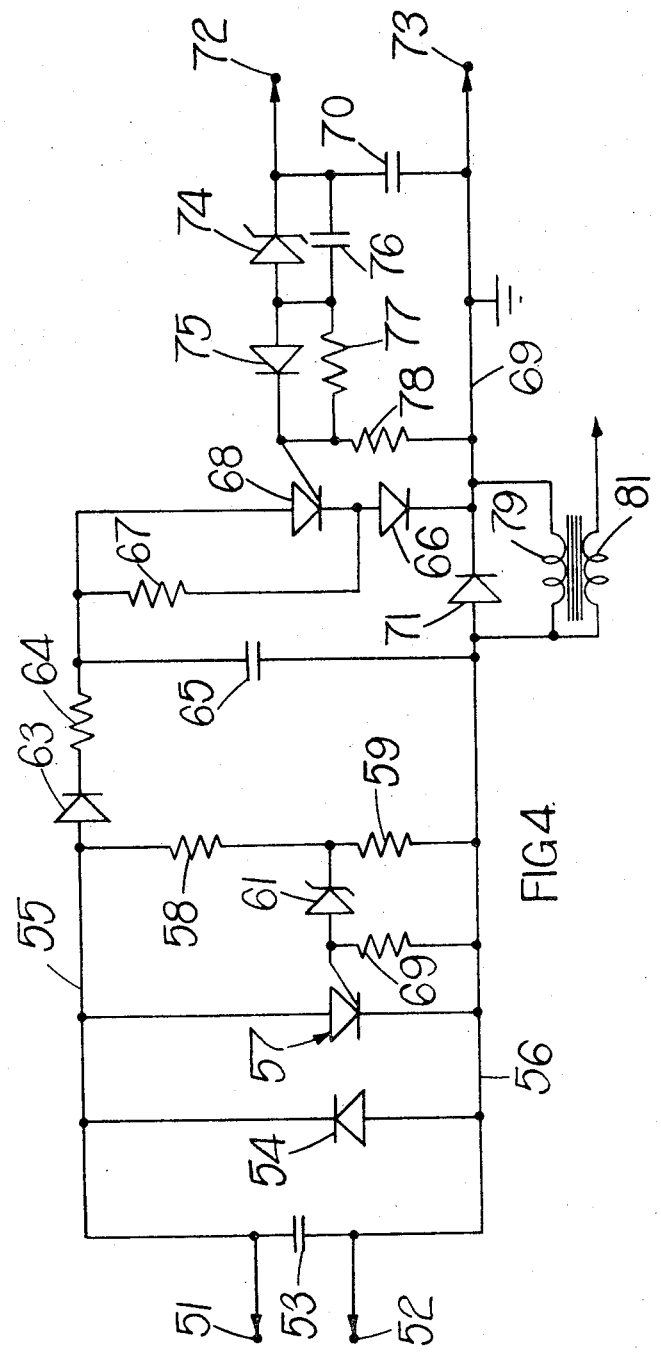
FIG. 4 is a circuit diagram illustrating a second example.

Referring now to the example shown in FIG. 4, the alternator provides a signal to a pair of input terminals 51, 52 which are bridged by a capacitor 53 and a diode 54 in parallel, so as to provide a half wave rectified signal to a pair of output lines 55, 56. Connected in parallel across the lines 55, 56 are a pair of circuits, one of which contains a thyristor 57, and the other of which contains a pair of resistors 58, 59 in series, the junction of the resistors 58, 59 being connected to the line 56 through a Zener diode 61 and a resistor 62 in series, and the junction of the resistor 62 and Zener diode 61 being connected to the gate of the thyristor 57. The line 55 is further connected to the line 56 through a diode 63, a resistor 64 and a capacitor 65 in series, and the junction of the resistor 64 and capacitor 65 is connected to the anode of a diode 66 through parallel paths containing respectively a resistor 67 and a thyristor 68. The cathode of the diode 66 is connected to an earthed line 69 which is connected through a diode 71 to the line 56.

The pick-up in this example provides power to terminals 72, 73, the terminal 73 being connected to the line 69, and the terminals 72, 73 being bridged by a capacitor 70. The terminal 72 is connected to the gate of the thyristor 68 through a Zener diode 74 and a diode 75 in series, the Zener diode 74 being bridged by a capacitor 76 and the diode 75 being bridged by a resistor 77. The gate of the thyristor 68 is further connected to the line 69 through a resistor 78. The diode 71 is bridged by the primary winding 79 of an ignition coil having a secondary winding 81 producing the required sparks.

The basic operation is similar to FIG. 1, the capacitor 65 being charged by the alternator to a voltage regulated by the thyristor 57, and the thyristor 68 being turned on to discharge the capacitor 65 through the winding 79 to produce the required sparks. In this example, the capacitor 65 is charged by a half-wave rectified system, so that the Zener diode D5 in FIG. 1 is no longer required, there being sufficient time between half cycles for the thyristors 57 and 68 to turn off. For the same reason, the diodes D9 and D10 in FIG. 1 are not required, and the capacitor 53, corresponding to the capacitor C1 in FIG. 1, can be reduced in size.

The neon tube D7 in FIG. 1 has in this example been replaced by a Zener diode 61, and it will be appreciated that these two components are equivalent to one another. The reverse bias in FIG. 1 by way of the resistor R4 is now replaced by the resistor 67 and diode 66.

In FIG. 4, the components used in the circuit from the pick-up to the gate of the thyristor 68 have been rearranged but they operate in substantially the same way as described with reference to FIG. 1, although the resistor VDR has now been replaced by the resistor 77. The reason for this is that it is intended that a different form of pick-up should be used in FIG. 4, consisting of two solid steel cylinders attached to the flywheel, and which create the advance and retard firing pulses.

It will of course be appreciated that the way in which the thyristor D12 in FIG. 1, and the equivalent thyristor 68 in FIG. 4, is fired is not important to the present invention. The discharge of the capacitor C3 in FIG. 1 or 65 in FIG. 4 can be used in other ways to produce a spark, and in fact the discharge need not be through a thyristor at all, although the use of a thyristor is preferred.

I claim:

1. A spark ignition system for an internal combustion engine, comprising in combination an alternator driven by the engine, a rectifier having input terminals and output terminals, means coupling said alternator to said input terminals, a capacitor, means coupling said capacitor to the output terminals of said rectifier, whereby said alternator charges said capacitor, voltage sensitive means connected across said capacitor and conducting at a predetermined capacitor voltage, means whereby said voltage sensitive means serves when conductive to short-circuit the alternator output, and means for discharging the capacitor at intervals to produce a spark, said means for discharging the capacitor including a thyristor connected in a series circuit across said capacitor, said series circuit including the primary winding of an ignition coil, the system further including engine-driven means for turning on said thyristor when a spark is required to discharge the capacitor through said primary winding, and said series circuit further including a pair of oppositely connected diodes in parallel, said oppositely connected diodes assisting in turn-off of said thyristor when the capacitor has discharged.

2. A system as claimed in claim 1 in which the voltage sensitive means comprises a second thyristor connected across the rectified alternator output, and means for turning the thyristor on when the capacitor voltage reaches the predetermined level.

3. A system as claimed in claim 2 in which said means for turning the second thyristor on is a neon tube.

4. A system as claimed in claim 2 in which said means for turning the second thyristor on is a Zener diode.

5. A system as claimed in claim 1 including a diode connected across said primary winding to prevent reverse charging of the capacitor.

6. A system as claimed in claim 1 including a diode positioned in said series circuit in the cathode path of the first-mentioned thyristor, and a resistor coupling the junction of the first thyristor and diode to the capacitor to reverse bias the first thyristor.

7. A system as claimed in claim 1 in which the rectifier is a half wave rectifier.

8. A system as claimed in claim 1 in which the rectifier is a full wave rectifier.

9. A system as claimed in claim 8 including a Zener diode between the rectifier and capacitor.

10. A system as claimed in claim 9 including a further capacitor connected across the Zener diode which is connected between the rectifier and first-mentioned capacitor, said further capacitor being coupled to the gate of the first thyristor to reverse bias the said gate.

11. A spark ignition system for an internal combustion engine, comprising in combination an alternator driven by the engine, a full wave rectifier having input terminals and output terminals, means coupling said alternator to the input terminals of the full wave rectifier, a circuit coupling the capacitor to the output terminals of the full wave rectifier, said circuit including a Zener diode, a thyristor connected in a circuit across said capacitor, said thyristor when conductive serving to discharge the capacitor, means operable upon discharge of said capacitor through the thyristor for producing a spark, and engine-driven means for turning on said thyristor when a spark is required, said Zener diode blocking the circuit from the rectifier to the capacitor for a portion of each cycle of the alternator output so as to facilitate turn-off of the thyristor.

12. A system as claimed in claim 11 including a capacitor connected across the Zener diode and connected through a resistor to the gate of the thyristor so as to reverse bias said gate.

13. A spark ignition system for an internal combustion engine, comprising in combination an alternator driven by the engine, a half wave rectifier having input terminals and output terminals, means coupling said alternator to the input terminals of said rectifier, means coupling the capacitor to the output terminals of said rectifier, a thyristor connected in a circuit across said capacitor, whereby conduction of said thyristor discharges said capacitor, means operable upon discharge of said capacitor for producing a spark, and engine-driven means for turning on the thyristor when a spark is required.

* * * * *